US011901630B1

(12) United States Patent
Cherrette

(10) Patent No.: US 11,901,630 B1
(45) Date of Patent: Feb. 13, 2024

(54) CONFOCAL PHASED ARRAY FED REFLECTOR ANTENNA BEAM STABILIZATION

(71) Applicant: Lockheed Martin Corporation, Bethesda, MD (US)

(72) Inventor: Alan Cherrette, Highlands Ranch, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 531 days.

(21) Appl. No.: 17/176,563

(22) Filed: Feb. 16, 2021

Related U.S. Application Data

(60) Provisional application No. 63/087,967, filed on Oct. 6, 2020.

(51) Int. Cl.
*H01Q 19/18* (2006.01)
*H01Q 3/20* (2006.01)
*H01Q 3/34* (2006.01)
*H01Q 1/28* (2006.01)

(52) U.S. Cl.
CPC ............... *H01Q 19/18* (2013.01); *H01Q 3/20* (2013.01); *H01Q 1/288* (2013.01); *H01Q 3/34* (2013.01)

(58) Field of Classification Search
CPC ............. H01Q 3/34; H01Q 3/20; H01Q 19/18
See application file for complete search history.

(56) References Cited

U.S. PATENT DOCUMENTS

| | | | | |
|---|---|---|---|---|
| 5,592,176 A | | 1/1997 | Vickers et al. | |
| 5,841,397 A | | 11/1998 | Hopkins | |
| 11,121,518 B1 | * | 9/2021 | Wroblewski | G02B 7/008 |
| 2004/0108961 A1 | * | 6/2004 | Hay | H01Q 25/007 343/781 CA |
| 2005/0048915 A1 | * | 3/2005 | Westall | H01Q 25/007 455/25 |
| 2005/0178874 A1 | * | 8/2005 | Wang | H01Q 1/288 244/3.18 |

(Continued)

OTHER PUBLICATIONS

Dragone, C. et al., "Imaging Reflector Arrangements To Form A Scanning Beam Using A Small Array," The Bell System Technical Journal, vol. 58, No. 2, pp. 501-515, Feb. 1979.

(Continued)

*Primary Examiner* — Mohammad Ali
*Assistant Examiner* — Vincent W Chang

(57) ABSTRACT

Provided herein are various improvements to antenna stabilization systems, such as employed on confocal phased array reflector antenna arrangements. In one example, a system includes a feed structure for a main reflector, the feed structure comprising an electronically scanned array (ESA) feed and a sub-reflector. The sub-reflector is configured to propagate a signal between the ESA feed and the main reflector. The system also includes a star tracker element coupled to the feed structure and configured to determine orientation information relative to star alignment, and laser distancing elements coupled to the feed structure and configured to determine distance measurements relative to the main reflector. A control system is configured to determine pointing errors of the main reflector based at least on the orientation information and the distance measurements, and these pointing errors can be used by the ESA feed to adjust steering of a signal towards a target.

15 Claims, 7 Drawing Sheets

(56) References Cited

U.S. PATENT DOCUMENTS

| | | | | |
|---|---|---|---|---|
| 2008/0180314 | A1* | 7/2008 | Liu | H01Q 3/20 342/358 |
| 2009/0224993 | A1* | 9/2009 | Peichl | G01S 13/426 342/175 |
| 2017/0365932 | A1* | 12/2017 | Spirtus | H01Q 19/192 |

OTHER PUBLICATIONS

Hawkins, G. J. et al., "Tracking Systems For Satellite Communications," IEE Proceedings, vol. 135, Pt. F, No. 5, pp. 393-407, Oct. 1988.

Marks, Geoffrey et al., "Performance Of The AstroMesh Deployable Mesh Reflector At Ka-Band Frequencies And Above," Fifteenth KA and Broadband Communications, Navigation and Earth Observation Conference, 8 pages, Sep. 23-25, 2009.

* cited by examiner

CONFOCAL PHASED ARRAY FED REFLECTOR ANTENNA BEAM STABILIZATION

RELATED APPLICATIONS

This patent application claims priority to U.S. Provisional Patent Application No. 63/087,967 that was filed on Oct. 6, 2020, and is entitled "CONFOCAL PHASED ARRAY FED REFLECTOR ANTENNA BEAM STABILIZATION," which is hereby incorporated by reference into this patent application.

TECHNICAL BACKGROUND

Various reflector antenna arrangements can be used for transmitting and receiving communications in concert with an electronically scanned array (ESA) feed. These ESA feeds include arrays of antenna elements that can electronically steer beams of radio frequency (RF) signals using phasing relationships among the antenna elements. One antenna arrangement includes a confocal phased array-fed reflector (CPAFR) antenna, also referred to a magnified phased array antenna. A CPAFR antenna typically has an ESA feeding a two-reflector arrangement, typically a parabolic sub-reflector and a parabolic main reflector that share a common focal point. The aperture radiation distribution of the ESA feed is magnified by the reflector arrangement, with a magnification factor equal to the ratio of the main reflector focal length to the sub-reflector focal length. The CPAFR antenna increases the ESA radiation pattern gain by the square of the magnification factor. The CPAFR antenna also decreases the ESA radiation pattern half power beam width (HPBW) and scan capability by the reciprocal of the magnification factor. Some properties of the ESA feed are preserved by the CPAFR antenna, such as the number of electronically scanned beams and the polarization of each beam. The CPAFR architecture provides a low cost, size, weight and power (CSWaP) approach to greatly increase the gain of a multi-beam ESA at the expense of reducing the field of view (FOV).

CPAFR antenna magnification can be increased by proportionally increasing the focal length, aperture diameter, and offset of the main reflector with no change to the ESA feed and sub-reflector. Practical magnification values are limited by the ability construct and handle large main reflectors. Currently, deployable space-based reflectors are in the 5 meter (m) to 6 m diameter class for Ka band operation. In the near future, Ka band reflectors with aperture diameters of 10 m to 12 m will become available. When reflectors increase in size, the antenna arrangements can become more sensitive to beam pointing errors, leading to reduced signal gain on a target. One way to reduce the beam pointing errors of large high-frequency reflector antennas is to employ auto-tracking systems. Such auto-tracking systems rely on receiving an externally provided RF signal to track. While receiving an externally provided RF tracking signal can work for cooperative or benign environments, this tracking signal becomes problematic in contested or denied environments and requires remotely located and costly equipment.

OVERVIEW

Electronically scanned arrays (ESA) can be augmented with various reflector arrangements to enhance beam magnification. One such reflector arrangement includes the confocal phased array-fed reflector (CPAFR) antenna. A CPAFR antenna typically has an ESA feeding a two-reflector arrangement, such as a parabolic sub-reflector and a parabolic main reflector that share a common focal point. However, as these reflectors increase in size to achieve higher beam magnifications, pointing errors become difficult to manage without using externally-sourced RF tracking signals subject to interference and jamming Provided herein are various improvements to high-frequency antenna beam stabilization and beam pointing systems and techniques, such as employed on CPAFR antennas. These enhanced beam stabilization and beam pointing systems can mitigate not only thermally-induced pointing errors, but also mechanically induced pointing errors (e.g. from thruster firings in space applications).

In one example implementation, a system includes a feed structure for a main reflector, the feed structure comprising an ESA feed and a sub-reflector. The sub-reflector is configured to propagate a signal between the ESA feed and the main reflector. The system also includes a star tracker element coupled to the feed structure and configured to determine orientation information relative to star alignment, and laser distancing measuring elements coupled to the feed structure and configured to determine distance measurements relative to the main reflector. A sensor system is configured to determine pointing errors of the main reflector based at least on the orientation information and the distance measurements, and these pointing errors can be used by the ESA feed to adjust steering of a signal towards a target.

In another example implementation, a method of operating an antenna system is presented where a sub-reflector is coupled to a feed structure and propagates a signal between an electronically scanned array (ESA) feed and a main reflector. In a star tracker element coupled to the feed structure, the method includes determining orientation information relative to star alignment. In this example, laser distancing measuring elements are also coupled to the feed structure, the method includes determining distance measurements relative to the main reflector. In a sensing system, the method includes determining pointing errors of the main reflector based at least on the orientation information and the distance measurements, and applying the pointing errors to the feed to adjust steering of a signal towards a target.

In yet another example implementation, a control system is presented for an antenna arrangement having a main reflector positioned in relation to a sub-reflector. The control system includes a star tracker interface configured to receive orientation information indicating a relative orientation of a feed structure housing the sub-reflector and an antenna feed system to star alignment. The control system includes a laser ranging interface configured to receive indications of distance measurements of the feed structure relative to the main reflector. Processing circuitry is configured to determine pointing errors of the main reflector relative to the feed structure based at least on the orientation information and the indications of the distance measurements. The processing circuitry is also configured to apply the pointing errors to instruct the antenna feed system to adjust steering of a signal towards a target.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
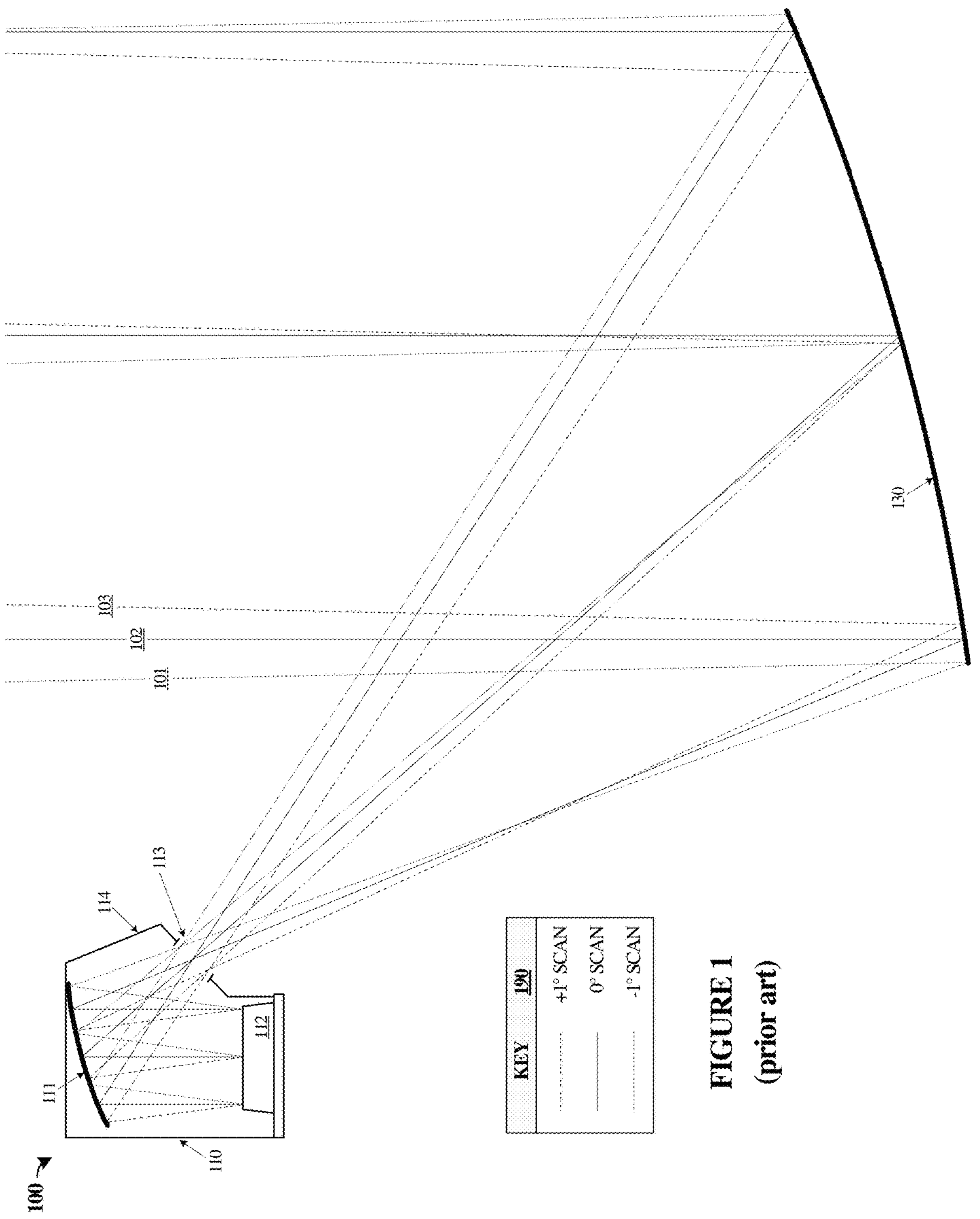
FIGURE 1 (prior art)
FIG. 1 illustrates a prior antenna system in an implementation.

Various antenna arrangements can be used for transmitting and receiving communications in concert with an electronically scanned array (ESA) feed, or other suitable radio frequency (RF) feeds. ESA feeds include arrays of antenna elements that can electronically steer beams of RF signals using phasing relationships among the antenna elements. ESA feeds can be augmented with various antenna/reflector arrangements to enhance beam magnification. One antenna arrangement is the confocal phased array-fed reflector (CPAFR) antenna. A CPAFR antenna typically has an ESA feeding a two-reflector arrangement comprising a parabolic sub-reflector and a parabolic main reflector that share a common focal point. CPAFR antenna magnification can be increased by proportionally increasing the focal length, aperture diameter, and offset of the main reflector with no change to the ESA feed and sub-reflector. Currently, deployable space-based reflectors are in the 5 m to 6 m diameter class for Ka band operation. At these frequencies and aperture sizes, HPBWs are on the order of 0.12°. In the near future, Ka band reflectors with aperture diameters of 10 m to 12 m will become available. At these aperture sizes, Ka-band HPBW will be on the order of 0.06°. A typical antenna pointing error of only 0.07° will cause a gain loss of 4.3 dB for 6 m diameter reflector antenna at Ka-band. Thus, beam pointing errors can significantly reduce the gain on a target and CPAFR antennas can become more sensitive to pointing errors as the size of the main reflector increases. Auto-tracking systems can be employed that adjust pointing of a CPAFR antenna based on receiving an externally provided RF signal. However, the use of externally provided signals is not ideal, as it adds complexity, and requires installation and management of remote equipment. Moreover, externally provided signals are susceptible to detection, disruption, or denial in contested environments or from RF interference.

Provided herein are various improvements to high-frequency antenna beam stabilization and pointing systems and techniques, such as employed on CPAFR antennas. These enhanced systems and techniques can mitigate not only thermally-induced pointing errors, but also mechanically induced pointing errors (e.g. from thruster firings in space applications). In one example implementation, a feed structure for a main reflector comprises an ESA feed and a sub-reflector, where the sub-reflector propagates a signal between the ESA feed and the main reflector. A star tracker element is rigidly attached to the feed structure and configured to determine orientation information for the feed structure relative to star alignment. Laser distance measuring elements are rigidly attached to the feed structure and configured to determine distance measurements of the feed structure relative to the main reflector. A sensing system is included to determine pointing errors of the main reflector based at least on the orientation information and the distance measurements. These pointing errors can be used to adjust steering of the ESA feed to direct a signal towards a target or receive a signal from a target. Thus, electronic stabilization of the antenna beam is achieved, providing for fast and reactionless changes to signal beam steering.

Turning first to FIG. 1, a brief description of an existing CPAFR antenna is included. FIG. 1 includes system 100 comprising feed structure 110 and main reflector 130. Feed structure 110 comprises housing 114 that includes sub-reflector 111 and ESA feed 112. Main reflector 130 and sub-reflector 111 each comprise a parabolic reflector, although other reflector types might be employed. Thus, FIG. 1 illustrates an example CPAFR antenna having ESA feed 112 positioned in relation to sub-reflector 111 and main reflector 130, which share a common focal point at approximately a point incident with aperture 113.

Ray trace equivalents of example signal beams 101-103 illustrate RF signal radiation originating at ESA feed 112, although similar concepts apply to received signals. Each beam corresponds to a different pointing configuration, such as shown for +1°, 0°, and −1° in key 190 of FIG. 1. Pointing or aiming of the direction of the beam can be achieved by moving any of elements 111, 112, and 130. However, small pointing changes are typically achieved by changing phasing relationships among antenna elements included in ESA feed 112. The aperture radiation distribution of ESA feed 112 is magnified by the reflector arrangement among sub-reflector 111 and main reflector 130, with the magnification factor equal to the ratio of the main reflector focal length to the sub-reflector focal length. The CPAFR antenna increases the ESA feed radiation pattern gain by the square of the magnification factor, and decreases the ESA feed radiation pattern Half Power Beam Width (HPBW) and scan capability by the reciprocal of the magnification factor. CPAFR antenna magnification can be increased by proportionally increasing the focal length, aperture diameter, and offset of the main reflector with no change to ESA feed 112 and sub-reflector 111. Practical magnification values are limited only by the ability construct large main reflectors. However, beam pointing errors (primarily due to the main reflector 130) can significantly reduce the gain on target.

One example way to reduce the pointing errors of large high frequency reflector antennas is to employ auto-tracking systems. Auto-tracking antenna systems rely on receiving an external RF signal to track. As mentioned above, the examples herein provide for reduction in pointing errors for large high frequency CPAFR antennas that does not rely on receiving an external RF tracking signal.

Figure 2:
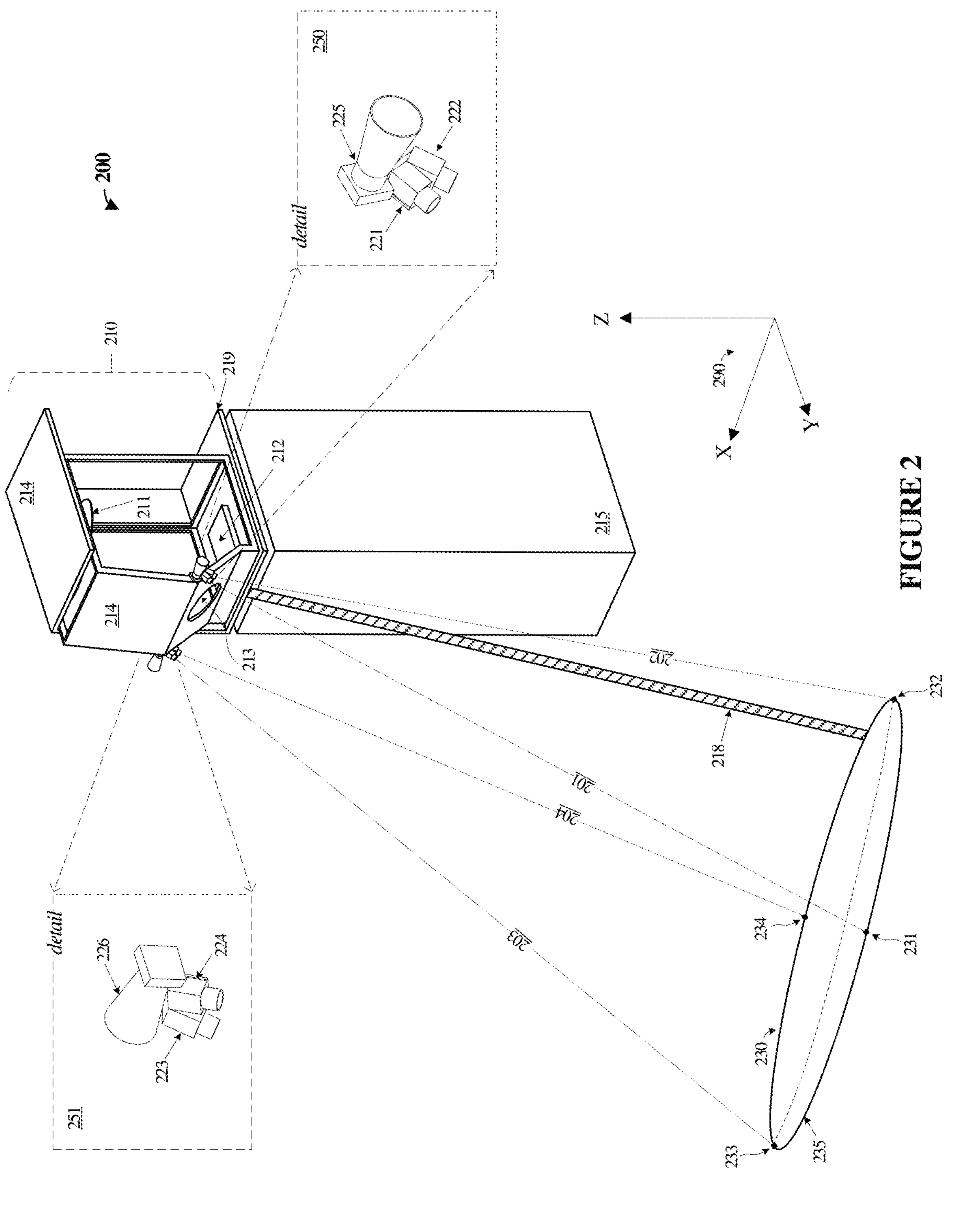
FIG. 2 illustrates an antenna system in an implementation.

FIG. 2 illustrates an example implementation of an enhanced antenna arrangement indicated by system 200. System 200 includes feed structure 210, spacecraft bus 215, and primary reflector 230. Feed structure 210 and spacecraft 215 are coupled to form an assembly, and reflector boom 218 couples primary reflector 230 to that assembly. Feed structure 210, spacecraft bus 215, and primary reflector 230 can comprise a spacecraft, satellite, or other similar craft which can be deployed into orbit about a central body for communications, monitoring, relaying, or other tasks. Dimensional stability of feed structure 210 is such that measurements of laser distance sensors 221-224 and star trackers 225-226 correlate to that of feed structure 210 to within a target accuracy.

Feed structure 210 includes sub-reflector 211 and feed array 212 which are housed by chassis 214 mounted to deck 219. In addition, feed structure 210 includes one or more sub-assemblies 250-251 that comprise star trackers and laser distance sensors. Sub-assembly 250 includes star tracker 225 and laser distance sensors 221-222. Sub-assembly 251 includes star tracker 226 and laser distance sensors 223-224. Although two star trackers are included in system 200 for redundancy, one star tracker can be omitted in some examples. Sub-assemblies 250-251 each form a rigidly coupled unit which are further rigidly coupled to feed structure 210. Feed structure 210 also includes aperture 213 through which RF signals or beams transit between primary reflector 230 and sub-reflector 211. In certain antenna/reflector arrangements, a focal point of both primary reflector 230 and sub-reflector 211 coincide at or near aperture 213. Aperture 213 might include a screen or iris mechanism.

Primary reflector 230 includes ranging targets 231-234 arranged on reflector rim 235. Primary reflector 230 is structurally coupled to feed structure 210 or satellite bus 215 via boom 218. Boom 218 can comprise any suitable structural member, such as truss member, strut, or rod, and the like. Primary reflector 230 comprises a parabolic reflector suitable for the range of frequencies or wavelengths employed by ESA feed 212. Suitable materials for primary reflector 230 are conductive materials comprising mesh, solid, honeycomb, or truss structures, which might be in foldable or deployable arrangements, along with structural support elements. One example of primary reflector 230 comprises a high-frequency perimeter truss mesh reflector. Primary reflector 230 also includes a plurality of ranging targets 231-234 which comprise elements arranged on reflector rim 235. Ranging targets 231-234 can comprise planar surfaces with diffuse reflective coatings which reflect a portion of ranging beams 201-204 back towards laser distance sensors on the feed structure 210. Typically, ranging beams 201-204 comprise optical beams of infrared, visible, or ultraviolet wavelengths, and materials of ranging targets 231-234 can be selected to reflect within the range of optical wavelengths employed by ranging beams 201-204.

Ranging beams 201-204 are emitted by associated laser distance sensors 221-224. Four ranging beams are employed in FIG. 2, although a different number can be employed in other examples, such as three or more. The use of four ranging beams will be discussed below in FIG. 4. Each of laser distance sensors 221-222 emits an optical beam for reflection by a particular ranging target. Thus, laser distance sensor 221 emits beam 201 for reflection by ranging target 231, laser distance sensor 222 emits beam 202 for reflection by ranging target 232, laser distance sensor 223 emits beam 203 for reflection by ranging target 233, and laser distance sensor 224 emits beam 204 for reflection by ranging target 234. From the reflection of ranging beams 201-204, laser distance sensors 221-224 can determine a distance or range of the corresponding ranging targets. Indications of these distances are provided to a control system (not shown in FIG. 2) for processing and determination of alignment or relative positioning of primary reflector 230 in relation to feed structure 210. Specifically, the control system computes a best fit plane of reflector rim 235 from the four distance measurements. Typically, an angle error <0.025° is computed due to main reflector miss-pointing, which corresponds to distance measurement errors <0.5 millimeters (mm). Since laser distance sensors 221-224 are coupled to feed structure 210, any measurements determined by laser distance sensors 221-224 can be proportional to a distance or alignment between feed structure 210 and primary reflector 230. Specifications for each of laser distance sensors 221-224 can include laser distance measuring sensors in the 0.5 mm accuracy class (0.02 inches), with an update rate of approximately 50 Hz or more.

Star trackers 225-226 are included to determine an attitude or orientation in three-dimensional space relative to a fixed background of stars. Star trackers 225-226 optically detect a set of stars within a predetermined field of view, and from those stars determine a relative attitude or orientation. Indications of this attitude or orientation are provided to a control system (not shown in FIG. 2) for processing and determination of orientations and positioning of feed structure 210 which includes ESA feed 212 and sub-reflector 211. Since star trackers 225-226 are coupled to feed structure 210, any measurements determined by star trackers 225-226 can be related to that of feed structure 210. Although star trackers 225-226 can be co-located with laser distance sensors 221-224, other configurations are possible. Star trackers 225-226 are operated in a redundant manner in this example, which can provide further refinement to star tracking capability/accuracy, or allow for continued operation when one start tracker fails. Specifications for each of star trackers 225-226 can include angle error <0.0028° in three axis (roll, pitch, & yaw). Example star trackers include Space Micro μSTAR-400M, with an accuracy of 1 σ (0.0014°) and an update rate of 100 Hz. Other examples include the Space Micro Miniature Integrated Star Tracker, with an accuracy of 1 σ (0.0028° and an update rate of 10 Hz, and the Therma T1 Star Tracker, with an accuracy of 1 σ (0.0025°) and an update rate of 10 Hz.

In operation, star trackers 225-226 and laser distance sensors 221-224 together can provide attitude and dimensional knowledge of feed structure 210 and primary reflector 230. From this knowledge, a control system can compute a determination of the current configuration of reflector rim 235. As mentioned above, star trackers 225-226 provide orientation knowledge of feed-structure 210, and laser distance sensors 221-224 determine relative alignment between primary reflector 130 to feed structure 210. Other information can be determined for use by the control system, namely a location of feed structure 210 or the spacecraft. This can be determined by radio navigation satellite service (RNSS), such as the global positioning system (GPS) or other such systems. Other conventional methods of determining spacecraft location can also be employed. The control system computes beam pointing error corrections based on the indications provided by star trackers and laser distance sensors, along with the location of the spacecraft. Beam pointing error corrections can be used to determine electronic beam stabilizations for ESA feed 212 to aim or point the beam towards a remote target. ESA feed 212 can make real-time adjustments to beam pointing using adjustments to element phasing and correct for errors in the pointing of emitted beams by system 200.

The plane of reflector rim 235 will deviate from a nominal value and cause beam pointing errors. The plane of reflector rim 235 can be measured relative to feed structure 210. Therefore, a measured normal to the plane of reflector rim 235 can be determined. By using the nominal rim plane normal and the measured rim plane normal, a (Δu, Δv) pointing correction can be calculated and applied to the beam pointing (u, v) coordinates of each beam. Applying this beam pointing correction at a 10 Hz to 50 Hz update rate will electronically stabilize beam pointing. It should be noted that the beam pointing angle error equals the primary reflector angle error multiplied by approximately 2. The actual factor depends on the CPAFR geometry and can be computed with Physical Optics (PO) base antenna analysis. For the 4 point (231-234) case shown in FIG. 2, the 16 beam pointing error is 0.015° and the 26 beam pointing error is 0.028°. The 26 beam pointing error is 0.23 of the half power beam width. This assumes a 16 laser distance measurement error of 0.02 in. (0.5 mm).

Figure 3:
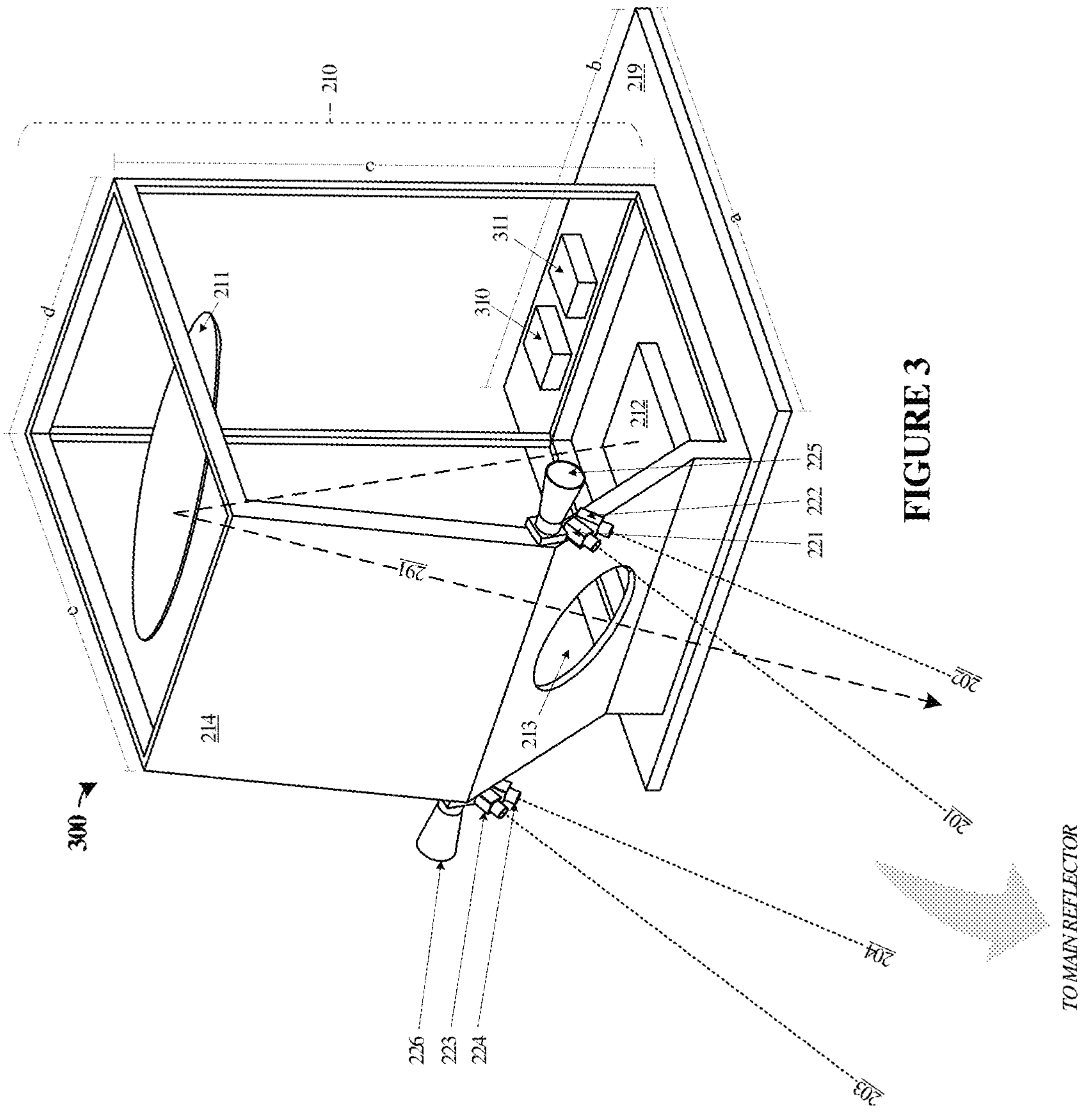
FIG. 3 illustrates a feed structure arrangement in an implementation.

FIG. 3 illustrates detailed view 300 of feed structure 210 and associated features. Feed structure 210 is formed by chassis or housing 214 which structurally supports or encases several components and includes iris or aperture 213. These components include sub-reflector 211, ESA feed 212, laser distance sensors 221-224, star trackers 225-226, control system 310, and radio navigation satellite service (RNSS) system 311. Feed structure 210 is shown mounted to deck 219. Deck 219 can provide a stable base for elements of feed structure 210 and be used to couple feed structure 210 to a satellite bus or other structure as a part of a satellite or spacecraft. Not shown in FIG. 3 for clarity is a primary or main reflector, although signal beam 291 is shown to illustrate one example pathway for RF energy emitted by ESA feed 212. Control system 310 can be an example of any of the control systems discussed herein.

Example dimensions a-e of feed structure 210 are included in FIG. 3 for reference. One example implementation has dimension 'a' as 90.0 inches (in.), dimension 'b' as 80.0 in., dimension 'c' as 67.8 in., dimension 'd' as 52.0 in., and dimension 'e' as 56.1 in. Other implementations might have different dimensions. Materials, structural elements, and structural elements arrangements of feed structure 210 are selected for dimensional stability and feed structure 210 is the reference structure for antenna pointing. Thus, star trackers 225-226 are mounted to feed structure 210 to ensure that measurements made by star trackers 225-226 also correspond to feed structure 210. Sources of pointing errors internal to feed structure 210 (e.g. pointing error due to ESA feed 212 and sub-reflector 211) get reduced by the reciprocal of the CPAFR magnification factor, which leaves the main reflector as the major source of pointing error.

Control system 310 can include various circuitry, logic, processing elements, memory elements, storage elements, and communication interfaces. Control system 310 can comprise one or more microprocessors, microcontrollers, field-programmable gate arrays (FPGAs), application specific integrated circuits (ASICs), discrete logic, or other elements. Control system 310 can be implemented within a single processing device but can also be distributed across multiple processing devices or sub-systems that cooperate in executing program instructions. Examples of control system 310 include general purpose central processing units, application specific processors, and logic devices, as well as any other type of discrete circuitry, control logic, or processing device, including combinations, or variations thereof. Control system 310 might include or might be coupled to one or more analog-to-digital conversion units to convert sensor data from an analog format into a digital format. Control system 310 might include one or more network interfaces, RF interfaces, or optical interfaces for communicating over associated links. For example, laser distance sensors 221-224, star trackers 225-226, and RNSS system 311 all communicate over associated links with control system 310. Control system 310 can also communicate commands or instructions to ESA feed 212.

Radio navigation satellite service (RNSS) system 311 comprises receiver equipment and antennas for receiving signals transmitted by one or more satellite nodes in a radio navigation system. Example radio navigation systems include global navigation satellite system (GNSS), Global Positioning System (GPS), GLONASS, Galileo, BeiDou Navigation Satellite System (BDS), LORAN, or other equivalents, enhancements, and augmentations. RNSS system 311 can determine a position of feed structure 210 within a coordinate system, to within an accuracy provided by the particular RNSS type and a quantity of transmission nodes in view.

Figure 4:
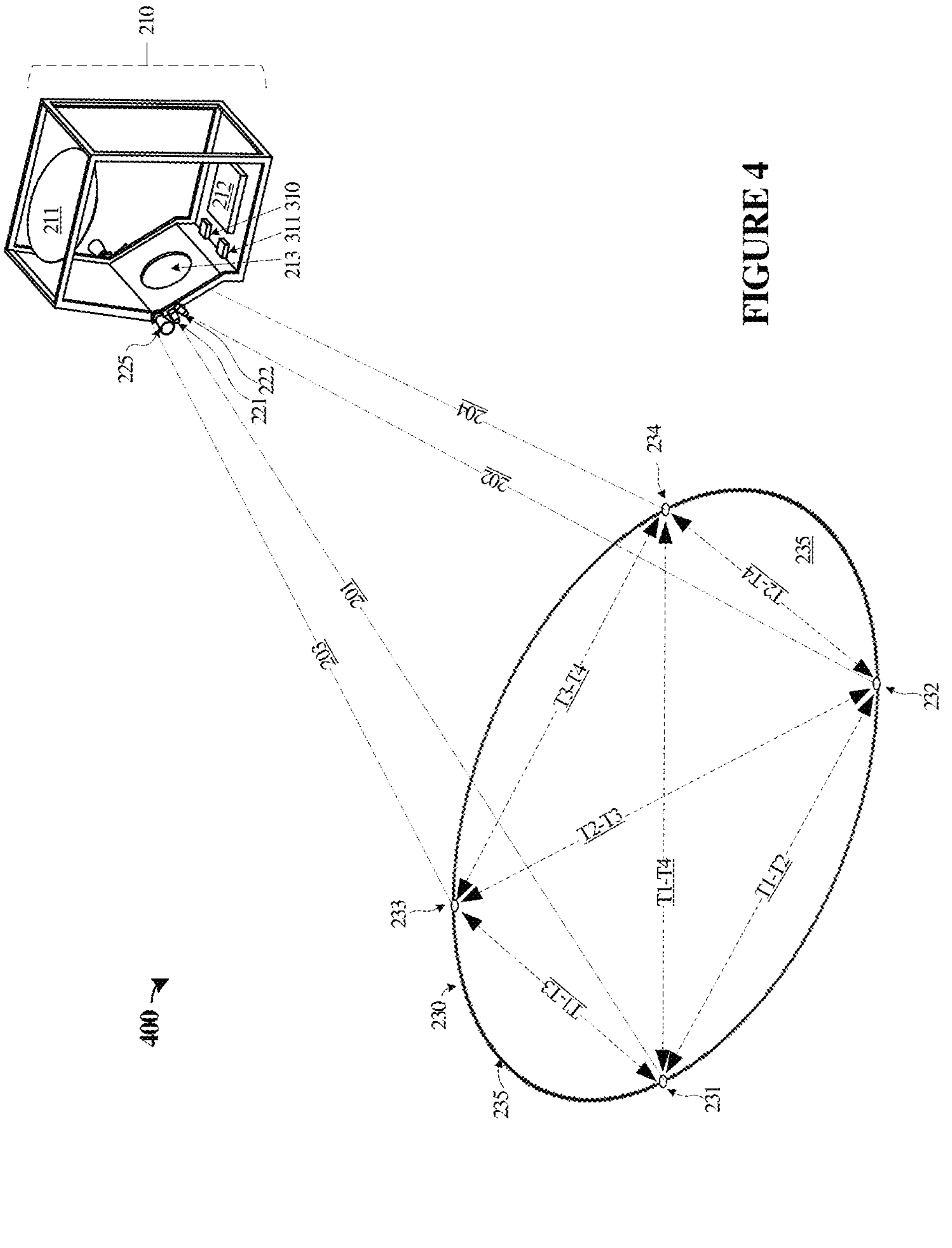
FIG. 4 illustrates an antenna system in an implementation.

FIG. 4 illustrates view 400 showing an example computation of beam pointing errors using measurements determined by laser distance sensors 221-224. These measurements can be employed to determine geometry of primary reflector 230, such as the plane of reflector rim 235 which can deviate from a nominal value and cause beam pointing errors. In order to compensate for contributions to pointing error from primary reflector 230, laser distance sensors 221-224 sense the location of primary reflector 230 relative to feed structure 210. One approach shown in FIG. 4 is to use laser distance sensors 221-224 attached to known locations on housing 214 of feed structure 210 to measure the location of primary reflector 230. The laser beams from laser distance sensors 221-224 are reflected off targets 231-234 on reflector rim 235. Note that a rim of a parabolic reflector with a circular aperture lies in a plane. Therefore, targets 231-234 should also lie in a parallel plane. The plane of reflector rim 235 can be measured relative to feed structure 210, and a measured normal to the plane of reflector rim 235 can be determined. By using the nominal rim plane normal and the measured rim plane normal, a ($\Delta u$, $\Delta v$) pointing correction can be calculated and applied to the beam pointing (u, v) coordinates of each beam.

In FIG. 4, an approximately 6 meter (m) or 240 in. reflector aperture diameter for primary reflector 230 is employed. This can correspond to primary reflector focal length of 384 in., center offset of 228 in. Sub-reflector 211 has an aperture diameter of 42.6 in., a focal length of 43.5 in., and a center offset of 27.9 in. ESA Feed 212 has a size of 29.3 in. by 29.3 in, and comprises 576 antenna elements. When combined with sub-reflector 211, this combined antenna system can have a magnification=8, 0.12° HPBW, and 2° field of view (FOV). Other dimensions and corresponding characteristics might apply in other implementations.

Laser distance measurements errors can be translated into CPAFR beam pointing error, and will be discussed in relation to FIG. 4. Laser distance measurements are made by laser beams of laser distance sensors 221-224 reflected off targets 231-234 on reflector rim 235. Geometric properties of primary reflector 230 can be determined, as well as relative distances between primary reflector 230 and feed structure 210. Knowing the orientation of rim plane 235 of primary reflector 230 provides the bulk of the information needed to correct for main reflector induced pointing errors. FIG. 4 depicts the geometry for converting laser distance measurement errors into CPAFR beam pointing error. Since the location and angular orientations of laser distance sensors 221-224 is a known quantity in relation to feed structure 210, then the four (4) sets of coordinates of where the 4 corresponding laser beams hit targets 231-234 can be computed from the 4 distance measurements. Several vectors can be calculated using results from laser distance measurements, namely T1-T2, T1-T3, T1-T4, T2-T3, T2-T4, and T3-T4. Note that only 3 points are needed to determine a plane that corresponds to rim plane 235 of primary reflector 230. When the coordinates of 4 points are available, such as shown in FIG. 4 corresponding to targets 231-234, four planes can be computed for enhanced error determination. Assuming the rim of primary reflector 230 lies in a plane, an approximation sufficient for certain material rigidity, any 3 of the 4 points corresponding to targets 231-234 can be used to determine a geometric plane corresponding to rim plane 235. Note that having 4 points not only provides redundancy, but the normals of the 4 planes computed from the 4 points can be averaged or otherwise processed to get a best fit estimate of the plane of the rim. Thus, using 4 points improves rim plane orientation accuracy as compared to 3 points.

In one example, a beam pointing error calculation can be performed with 4 laser distance measurements assuming a maximum laser distance measurement error of 0.02 in. (0.5 mm) and averaging the normals of the four computed planes. Using 4 points, the pointing error is about 0.2 times the half power beam width, assuming a maximum negative error of −0.02 in. for targets 231 and 232 and a maximum positive error of +0.02 in. for targets 233 and 234. This produces the largest reflector angular error for the given sensor geometry. A statistical approach to the analysis might provide a more accurate estimate of the relationship between reflector angular error and distance sensor measurement error. The averaging used in a 4 point case reduces the largest reflector angle error at any given probability when comparing to the 3 point case. For example, the expected reflector angle error (1 σ) for the 4 point case is 0.0076°, which is 75% of the expected reflector angle error (1 σ) for the 3 point case) (e.g.0.0101°. The largest reflector angle error with probability less than 0.95 (2 σ) for the 4 point case is 0.014°, which is 70% of the corresponding reflector angle error (2 σ) for the 3 point case)(e.g.0.020°. Further reductions in reflector angle error can be achieved by adding more measurement points to the rim.

It should be noted that the beam pointing angle error equals the reflector angle error multiplied by a factor of approximately 2. The actual factor depends on the CPAFR geometry and can be computed with Physical Optics (PO) base antenna analysis (e.g. GRASP antenna simulation software). For the 4 point case, the 16 beam pointing error is 0.015° and the 26 beam pointing error is 0.028°. The 26 beam pointing error is 0.23 of the half power beam width. This assumes a 16 laser distance measurement error of 0.02 in. (0.5 mm). This accuracy (0.5 mm) is achievable with industrial class laser measurement devices.

Figure 5:
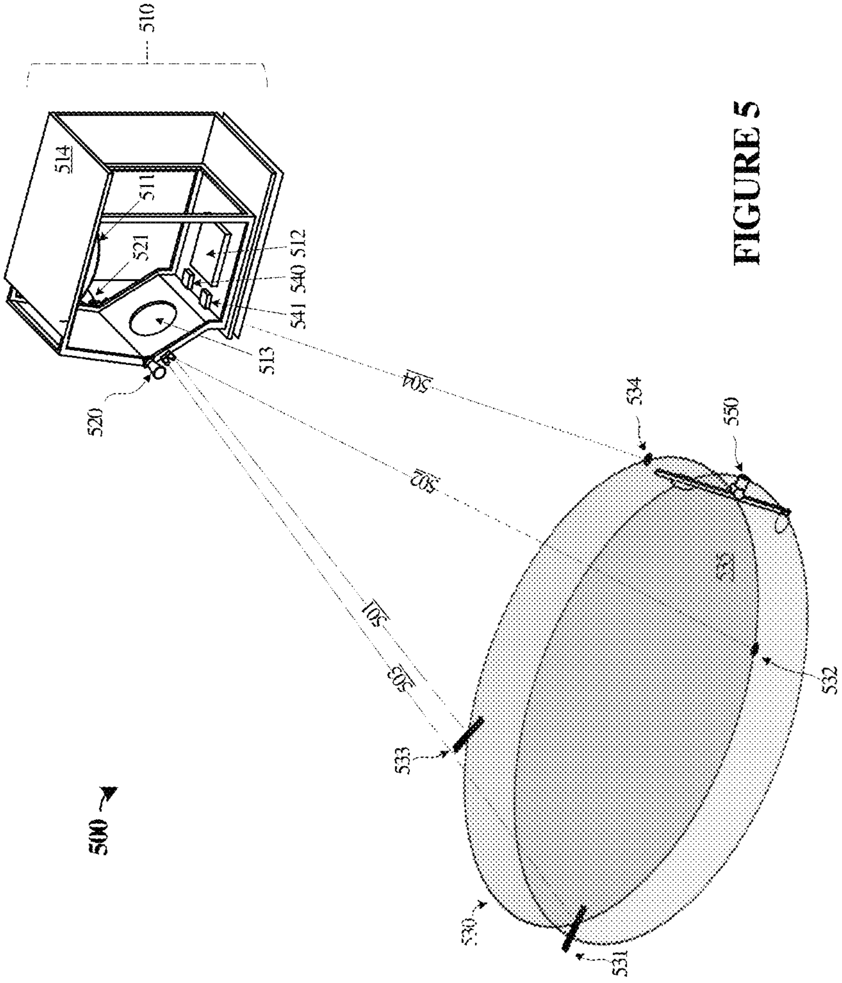
FIG. 5 illustrates an antenna system in an implementation.

FIG. 5 illustrates another implementation of targets on a primary reflector. System 500 includes feed structure 510 and primary reflector 530 which is movable on gimbal mechanism 550 located at the edge of primary reflector 530. A boom structure coupling feed structure 510 to primary reflector 530, as well as a satellite bus, are omitted from FIG. 5 for clarity. Feed structure 510 includes similar elements as that discussed for feed structure 210 herein, although variations are possible. In FIG. 5, feed structure 510 includes sub-reflector 511, ESA feed 512, aperture 513, housing 514, assemblies 520-521, and control system 540. Assemblies 520-521 include laser distancing devices and star tracker devices.

System 500 describes a 6 m aperture diameter CPAFR antenna and produces multiple 0.12° HBPW beams that can be electronically scanned anywhere in a 2° diameter FOV. For example, the Earth as seen from geo-stationary orbit (GSO) has a 17.4° diameter. Thus, gimbal mechanism 550 is provided to move the 2° diameter FOV to anywhere in the 17.4° diameter Earth disk as seen from GSO. Gimbal mechanism 550 comprises a two-axis gimbal and can gimbal primary reflector 530±4.4° in elevation and ±4.4° in azimuth. Degradations to antenna patterns by the optical misalignments produced by this approach can be corrected with ESA feed 512. The beam error techniques and structures described herein can still be employed when gimballing primary reflector 530.

However, to provide for distancing measurements to be performed on targets 531-534, the shapes or sizes of targets 531-534 are enlarged such that the laser beams emitted by assemblies 520-521 fall on targets 531-534 over the full range of gimbal motion. FIG. 5 thus shows a 6 m aperture diameter CPAFR antenna with enlarged reflector rim targets that accommodate a gimbal range of motion of ±4.6° in elevation and ±4.6° in azimuth. Depending on the location of gimballing provided by the corresponding gimbal mechanism, one or more of targets 531-534 will have modified shapes from that shown in prior Figures. For example, FIG. 5 shows targets 531 and 533 as elongated strips to accommodate a large range of motion for that corresponding edge of primary reflector 530, while targets 533 and 534 are shown as slightly elliptical or elongated to accommodate a smaller range of motion for that corresponding edge of primary reflector 530.

Only pointing knowledge is needed for primary reflector 530 since the beam pointing correction can be done electronically with ESA feed 512 for each beam. Advantageously, this is not a mechanical control problem because RF beam correction is momentum-less. Also, beam correction updates can be as fast as the laser distancing and star tracking sensor data can be generated. Example sensor update rates vary form 10 Hz to 50 Hz. At update rates in this range, not only can thermally induced pointing errors be mitigated, but mechanically induced pointing errors (e.g. from thruster firings) may also be mitigated. The proposed enhancements discussed herein to CPAFR antenna pointing can thus be described as electronic beam stabilization.

Figure 6:
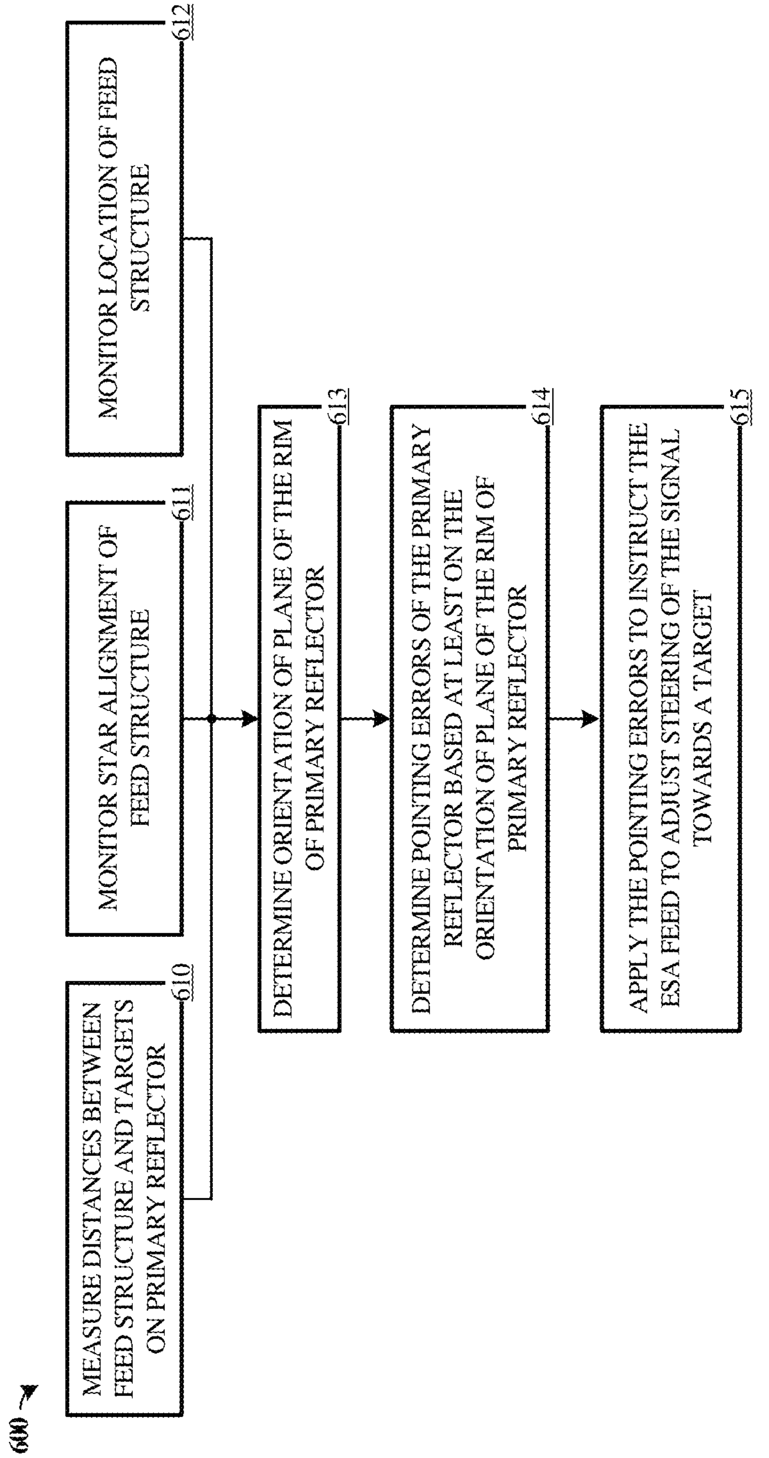
FIG. 6 illustrates a method of operating an antenna system in an implementation.

FIG. 6 illustrates a method of operating an antenna system in an implementation. Operations 600 are included in FIG. 6. The operations of FIG. 6 can be executed by elements found in any of the Figures herein, although for exemplary purposes the operations are discussed below in the context of FIGS. 2-4. Operations 610-612 can all occur concurrently or in parallel, with measurements of each operation periodically or cyclically provided to control system 310. The operations of control system 310 can also be cyclically performed as new measurements or data are obtained, establishing one or more calculation loops to determine errors and associated corrections in the pointing or orientation of feed structure 210 or primary reflector 230.

In operation 610, laser distance sensors 221-224 measure distances between feed structure 210 and targets 231-234 on primary reflector 230. These distances are measured by reflecting individual laser beams off targets 231-234 positioned along a rim of primary reflector 230. Targets 231-234 can comprise planar surfaces with diffuse reflective coatings which back-reflects at least a portion of incident optical energy emitted by an associated one of laser distance sensors 221-224. From this reflection, and a time-dependent calculation of propagation delay corresponds to a distance between the particular laser distance sensor and associated target. Since laser distance sensors 221-224 are coupled to feed structure 210 at selected places and orientations, any measurements of laser distance sensors 221-224 can be related to that of feed structure 210. Laser distance sensors 221-224 each report a distance measurement periodically over a communication link to control system 310. Control system 310 can receive these distance measurements, which typically comprise digital indications of the distance in chosen units, and store the indications for processing.

In operation 611, star trackers 225-226 monitor star alignment of feed structure 210 relative to a set of background stars. Star trackers 225-226 image a portion of the sky and compare incident light from a selection or pattern of stars to a reference star catalog or map to determine an orientation or attitude of the star tracker in relation to star locations. Since star trackers 225-226 are coupled to feed structure 210 at a selected place and orientation, any measurements of star trackers 225-226 can be related to that of feed structure 210. Only one star tracker might be needed at any given moment, but two or more star trackers can be deployed on feed structure 210 to provide redundancy and reliability during outages or when interference is experienced by one star tracker. Star trackers 225-226 each report an orientation measurement periodically over a communication link to control system 310. Control system 310 can receive these orientation measurements, which typically comprise digital indications of the orientation in chosen units, and store the indications for processing.

In operation 612, RNSS system 311 monitors a location of feed structure 210 in relation to a coordinate system of the RNSS. This location can include an indication of a latitude, longitude, and altitude with relation to a central body, such as the Earth, Moon, planet, or other orbited body and time. Other coordinate systems might be employed for cislunar space, heliocentric orbits, or hyperbolic trajectories. The location measurements are employed to determine relative locations in real space or inertial space between feed structure 210 and a target object or target receiver for which feed structure 210 desires to direct communications or RF energy toward. RNSS system 311 reports a location measurement periodically over a communication link to control system 310. Control system 310 can receive these location measurements, which typically comprise digital indications of the location in chosen units, and store the indications for processing. Other non-RNSS satellite location methods could also be used to determine the satellite and therefore feed structure location such as those used by ground stations.

Once the measurements of operations 610-612 are obtained by control system 310, such as over associated communication interfaces/links, then control system 310 determines (614) pointing errors of primary reflector 230 based at least on the orientation of a plane of rim 235 of primary reflector 230. An orientation of the plane of rim 235 of primary reflector 230 is first determined (613) using distance measurements provided by laser distance sensors 221-224, one or more planes representing rim 235 can be determined. For example, when four (4) targets 231-234 are employed for distances along different points of rim 235, four planes can be determined. Control system 310 determines normals of at least the four planes defined by sets of three distance measurements, and average the normals to calculate a best fit for a plane defining rim 235. This plane corresponds to a relative orientation between feed structure 210 and primary reflector 230.

Measurements of star trackers 225-226 can be employed as a baseline orientation of feed structure 210 from which the plane of rim 235 can be measured. Errors between the expected orientation of the plane of rim 235 and the orientation of feed structure 210 can be determined by control system 310. Control system 310 can employ these errors (615) to direct a pointing of a beam emitted by ESA feed 212. ESA feed 212 can accept indications of beam pointing adjustments and adjust a phasing/delay among antenna elements of RF signals emitted or received by the ESA feed 212 to affect the pointing of an emitted or received RF beam. This RF beam is directed by sub-reflector 211 to primary reflector 230 for transmission to or reception by a target. Thus, control system 310 can instruct ESA feed 212 to adjust steering of the signal or beam towards a target and reduce or eliminate errors in the aiming that arise from misalignment or orientation errors between feed structure 210 and primary reflector 230. ESA 212 electronically adjusts beam pointing, which incurs no mechanical delays nor imparts any momentum. Thus, update rates for beam pointing are limited by the processing capability of control system 310 and by the sensor detection rate of laser distance sensors 221-224, star trackers 225-226, and RNSS system 311, which in one example is a rate of 50 Hz. Control system 310 determines the pointing errors at an update rate great enough to compensate for at least a portion of mechanically induced pointing errors. At these update rates, not only can thermally induced pointing errors be mitigated, but mechanically induced pointing errors (e.g. from thruster firings) may also be mitigated or eliminated.

Beam pointing adjustments can also correspond to a gimballed primary reflector. For example, FIG. 5 illustrates when primary reflector 530 is gimbaled to move the antenna field of view (FOV). In FIG. 5, gimbal mechanism 550 is provided to move the FOV of primary reflector 530. Gimbal mechanism 550 might gimbal primary reflector 530 over a range in elevation and azimuth, among other configurations. Control system 540 can determine beam pointing error during and after gimbal operations complete using measurements obtained by laser distance measurements of the enlarged targets 531-534. Thus, primary reflector 530 is positioned on gimbal mechanism 550 configured to produce a range of orientations of primary reflector 530 relative to feed structure 510. Shapes of targets 531-534 are selected to ensure reflection of the beams emitted by the laser distancing elements over the range of gimballing/orientations.

Advantageously, the techniques described herein can correct for pointing error without usage of an external tracking signal, which makes the systems described herein impervious to jamming of such tracking signals. Moreover, the disclosed enhancements can be used for transmit CPAFRs as well as receive CPAFRs, and hence allows the transmit and receive function to be spatially isolated. As the primary or main reflector size increases in CPAFR systems (increasing focal length, diameter, and offset proportionally), the pointing error decreases linearly. The enhanced techniques herein can be applied to scaled up CPAFRs with aperture diameters of 12 m or more, which is in the range of high frequency perimeter truss mesh reflectors that will be available in the near future. The enhanced techniques herein can maintain beam pointing accuracy for High Throughput Satellites (HTS) and can greatly increase communications capacity by employing large aperture CPAFR antennas. The disclosed implementations electronically stabilize beam pointing for a CPAFR antenna (e.g. transmit CPAFRs, receive CPAFRs, and combined transmit and receive CPAFRs). The disclosed implementations can reduce or eliminate the pointing problem for spacecraft payloads that need high frequency (Ka-band and above) large aperture (6 m to 12 m dia.) antennas. In particular, CPAFR systems used in communication satellites with advanced anti-jamming capabilities and HTS satellites can benefit from the disclosed examples.

Figure 7:
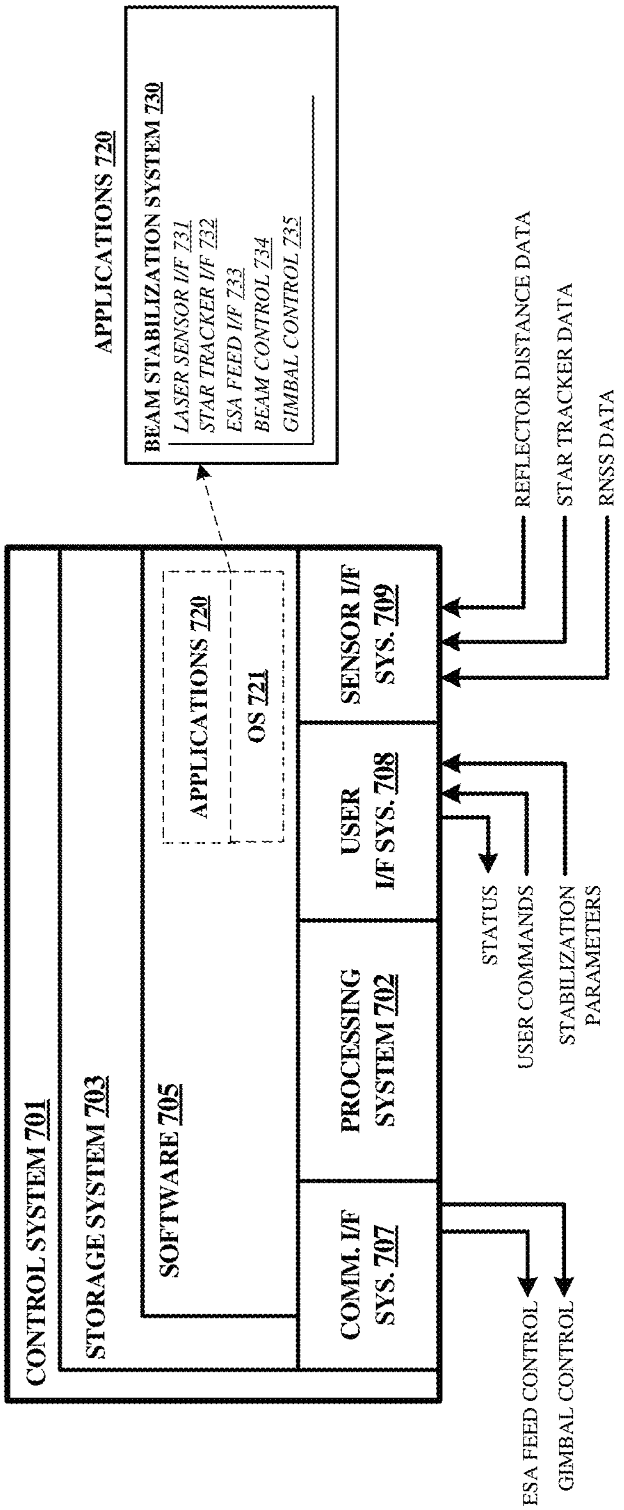
FIG. 7 illustrates an antenna control system and software in an implementation.

FIG. 7 illustrates control system 701 and associated software 705 in an implementation. FIG. 7 illustrates control system 701 that is representative of any system or collection of systems in which the various operational architectures, scenarios, and processes disclosed herein may be implemented. For example, control system 701 can be used to implement elements of control system 310 of FIGS. 3 and 4, and control system 540 of FIG. 5, although variations are possible.

Control system 701 may be implemented as a single apparatus, system, or device or may be implemented in a distributed manner as multiple apparatuses, systems, or devices. Control system 701 includes, but is not limited to, processing system 702, storage system 703, software 705, communication interface system 707, user interface system 708, and sensor interface system 709. Processing system 702 is operatively coupled with storage system 703, communication interface system 707, user interface system 708, and sensor interface system 709.

Processing system 702 loads and executes software 705 from storage system 703. Software 705 includes applications 720 comprising beam stabilization system 730, which is representative of the processes, services, and platforms discussed with respect to the included Figures. When executed by processing system 702 to provide stabilization control and beam pointing error correction for RF transceiver systems, among other services, software 705 directs processing system 702 to operate as described herein for at least the various processes, operational scenarios, and sequences discussed in the foregoing implementations. Control system 701 may optionally include additional devices, features, or functionality not discussed for purposes of brevity.

Referring still to FIG. 7, processing system 702 may comprise a microprocessor and processing circuitry that retrieves and executes software 705 from storage system 703. Processing system 702 may be implemented within a single processing device, but may also be distributed across multiple processing devices or sub-systems that cooperate in executing program instructions. Examples of processing system 702 include general purpose central processing units, application specific processors, and logic devices, as well as any other type of processing device, combinations, or variations thereof.

Storage system 703 may comprise any computer readable storage media readable by processing system 702 and capable of storing software 705. Storage system 703 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 703 may also include computer readable communication media over which at least some of software 705 may be communicated internally or externally. Storage system 703 may be implemented as a single storage device, but may also be implemented across multiple storage devices or sub-systems co-located or distributed relative to each other. Storage system 703 may comprise additional elements, such as a controller, capable of communicating with processing system 702 or possibly other systems.

Software 705 may be implemented in program instructions and among other functions may, when executed by processing system 702, direct processing system 702 to operate as described with respect to the various operational scenarios, sequences, and processes illustrated herein. For example, software 705 may include program instructions comprising applications 720 and operating system 721 that provide stabilization control and beam pointing error correction for RF transceiver systems, among other services. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 705 may include additional processes, programs, or components, such as operating system software or other application software, in addition to or that include beam stabilization system 730. Software 705 may also comprise firmware or some other form of machine-readable processing instructions executable by processing system 702.

Software 705, when loaded into processing system 702 and executed, may transform a suitable apparatus, system, or device (of which control system 701 is representative) overall from a general-purpose computing system into a special-purpose computing system customized to provide stabilization control and beam pointing error correction for RF transceiver systems, among other services. Indeed, encoding software 705 on storage system 703 may transform the physical structure of storage system 703. The specific transformation of the physical structure may depend on various factors in different implementations of this description. Examples of such factors may include, but are not limited to, the technology used to implement the storage media of storage system 703 and whether the computer-storage media are characterized as primary or secondary storage, as well as other factors. For example, if the computer readable storage media are implemented as semiconductor-based memory, software 705 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Applications 720 can include beam stabilization system 730. Beam stabilization system 730 includes laser sensor interface 731, star tracker interface 732, ESA feed interface 733, beam control 734, and gimbal control 734. Laser sensor interface 731 comprises a laser ranging interface and receives indications of distance measurements from laser distance measurement devices. Star tracker interface 732 receives indications of orientation measurements from one or more star tracker measurement devices. Also, although not shown in FIG. 7, applications 720 can also receive indications of a position or location provided by an RNSS system or equivalent system. These indications from laser distance measurement devices, star tracker device, and RNSS systems can be provided in an analog or digital format, and can be periodically provided according to an update rate of the systems/devices.

Beam control 734 monitors the indications provided by laser distance measurement devices, star tracker device, and RNSS systems to determine beam pointing errors for a beam emitted by an ESA feed (not shown). These beam pointing errors can be due to orientation mis-alignment with a primary reflector in relation to a feed structure that houses a sub-reflector and ESA feed. An orientation of a plane of the rim of the primary reflector is determined by beam control 734 and this orientation is employed to make adjustments to pointing of an RF beam emitted by the ESA feed. Instructions or commands to alter a beam pointing are provided to the ESA feed over ESA feed interface 733, and provided in a particular format required by the ESA feed. Responsively, the ESA feed can electronically steer the RF beam using phasing relationships among antenna elements of the ESA feed. In another example, beam control 734 processes orientation information to determine a baseline orientation of a feed structure, processes distance measurements relative to targets on a primary reflector to determine a relative orientation between the feed structure and the primary reflector, and processes the relative orientation and the baseline orientation to determine pointing errors.

In addition to beam pointing using electronically effected phasing relationships, a primary reflector might be gimballed to reach a greater field-of-view than possible with electronic steering alone. Gimbal control 734 can determine gimbal adjustments and indicate these adjustments to a gimbal mechanism or other suitable mechanism for effecting changes to the pointing of a primary reflector. The pointing or steering of the RF beam, whether via gimballing of the primary reflector or not, can also be informed by RNSS system positioning information that is used to relate a position in space of an ESA feed to a remote target. Moreover, although the operations of applications 720 are discussed in terms of emission of RF energy, it should be understood that reception of RF energy can be handled in a similar fashion.

Communication interface system 707 may include communication connections and devices that allow for communication with other computing systems, transceiver control interfaces, or electrical components (not shown) over communication links or communication networks (not shown). Examples of connections and devices that together allow for inter-system communication may include transceivers, network interface controllers, antennas, power amplifiers, RF circuitry, and other communication circuitry. The connections and devices may communicate over communication media to exchange communications with other computing systems or networks of systems, such as metal, glass, air, or any other suitable communication media. Physical or logical elements of communication interface system 707 can receive link/quality metrics, and provide link/quality alerts to users or other operators.

Communication interface system 707 may include portions of sensor system interface 709. Sensor system interface 709 comprises various hardware and software elements for interfacing with optical sensors and inertial sensors, such as transceiver equipment. Analog-to-digital conversion equipment, filtering circuitry, data processing elements, or other equipment can be included in sensor system interface 709.

Communication between control system 701 and other elements or systems, such as an ESA feed or associated transceiver control circuity (not shown), may occur over communication links or communication networks and in accordance with various communication protocols, combinations of protocols, or variations thereof. For example, control system 701 when implementing a control device, might communicate with sensors or transceiver control elements over corresponding digital communication links comprising Ethernet interfaces, serial interfaces, serial peripheral interface (SPI) links, inter-integrated circuit (I2C) interfaces, universal serial bus (USB) interfaces, UART interfaces, or wireless interfaces. When network links are employed, examples networks include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some network communication protocols that may be used include, but are not limited to, the Ethernet, Internet protocol (IP, IPv4, IPv6, etc . . . ), the transmission control protocol (TCP), and the user datagram protocol (UDP), as well as any other suitable communication protocol, variation, or combination thereof.

User interface system 708 may be optionally included, and comprise a software or virtual interface such as a terminal interface, command line interface, or application programming interface (API). User interface system 708 may also include physical user interfaces, such as keyboard, a mouse, a voice input device, or a touchscreen input device for receiving input from a user during assembly, manufacturing, or testing operations. Output devices such as a display interfaces, audio interfaces, web interfaces, terminal interfaces, and other types of output devices may also be included in user interface system 708. User interface system 708 can provide output and receive input over a network interface, such as communication interface system 707. In network examples, user interface system 708 might packetize data for receipt by a display system or computing system coupled over one or more network interfaces. User interface system 708 may comprise API elements for interfacing with users, other data systems, other user devices, web interfaces, and the like. User interface system 708 may also include associated user interface software executable by processing system 702 in support of the various user input and output discussed above. Separately or in conjunction with each other and other hardware and software elements, the user interface software and user interface devices may support a console user interface, graphical user interface, a natural user interface, or any other type of user interface.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A system, comprising:

a feed structure comprising an electronically scanned array (ESA) feed and a sub-reflector configured to propagate a signal between the ESA feed and a main reflector;

a star tracker element coupled to the feed structure and configured to determine orientation information relative to star alignment;

laser distancing elements coupled to the feed structure and configured to determine distance measurements relative to a plurality of reflective targets disposed about a rim of the main reflector, the targets having corresponding shapes selected to provide reflection of beams emitted by the laser distancing elements over a range of orientations relative to the feed structure producible by a gimbal mechanism for the main reflector; and a control system configured to determine pointing errors of the main reflector based at least on the orientation information and the distance measurements.

2. The system of claim 1, comprising:

the control system configured to apply the pointing errors to a position of the feed structure determined from a radio navigation satellite service (RNSS) to instruct the ESA feed to adjust steering of the signal towards a target.

3. The system of claim 1, wherein the distance measurements relative to the main reflector comprise at least four distance measurements made about the rim of the main reflector, and comprising:

the control system configured to determine normals of at least four planes defined by sets of three distance measurements, and average the normals to calculate a best fit for a plane defining the rim, wherein the plane corresponds to a relative orientation between the feed structure and the main reflector.

4. The system of claim 1, comprising:

the control system configured to process the orientation information to determine a baseline orientation of the feed structure, process the distance measurements to determine a relative orientation between the feed structure and the main reflector, and process the relative orientation and the baseline orientation to determine the pointing errors.

5. The system of claim 1, comprising:

at least one additional star tracker coupled to the feed structure and configured to determine additional orientation information relative to additional star alignment; and the control system configured to employ the additional orientation information in a redundant manner to the orientation information.

6. The system of claim 1, wherein the control system determines the pointing errors at a rate great enough to compensate for at least a portion of mechanically induced pointing errors from thruster firings associated with the feed structure.

7. The system of claim 1, wherein a dimensional stability of the feed structure is such that measurements of at least the laser distancing elements correlate to that of the feed structure to within a target accuracy.

8. A method of operating an antenna system, comprising:

in a star tracker element coupled to a feed structure, determining orientation information relative to star alignment;

in laser distancing elements coupled to the feed structure, determining distance measurements relative to a plurality of reflective targets disposed about a rim of a main reflector, the reflective targets having corresponding shapes selected to provide reflection of beams emitted by the laser distancing elements over a range of orientations relative to the feed structure producible by a gimbal mechanism for the main reflector; and in a control system, determining pointing errors of the main reflector based at least on the orientation information and the distance measurements, wherein a sub-reflector coupled to the feed structure is configured to propagate signals between an electronically scanned array (ESA) feed and the main reflector.

9. The method of claim 8, further comprising:

in the control system, applying the pointing errors to a position of the feed structure determined from a radio navigation satellite service (RNSS) to instruct the ESA feed to adjust steering of the signal towards a target.

10. The method of claim 8, wherein the distance measurements relative to the main reflector comprise at least four distance measurements made about the rim of the main reflector, and further comprising:

in the control system, determining normals of at least four planes defined by sets of three distance measurements, and average the normals to calculate a best fit for a plane defining the rim, wherein the plane corresponds to a relative orientation between the feed structure and the main reflector.

11. The method of claim 8, further comprising:

in the control system, processing the orientation information to determine a baseline orientation of the feed structure, processing the distance measurements to determine a relative orientation between the feed structure and the main reflector, and processing the relative orientation and the baseline orientation to determine the pointing errors.

12. The method of claim 8, further comprising:

in at least one additional star tracker coupled to the feed structure, determining additional orientation information relative to additional star alignment; and in the control system, employing the additional orientation information in a redundant manner to the orientation information.

13. The method of claim 8, wherein the control system determines the pointing errors at a rate great enough to compensate for at least a portion of mechanically induced pointing errors from thruster firings associated with the feed structure.

14. The method of claim 8, wherein a dimensional stability of the feed structure is such that measurements of at least the laser distancing elements correlate to that of the feed structure to within a target accuracy.

15. A control system for an antenna arrangement having a main reflector positioned in relation to a sub-reflector, the control system comprising:

a star tracker interface configured to receive orientation information indicating a relative orientation of a feed structure housing the sub-reflector and an antenna feed system to star alignment;

a laser ranging interface configured to receive indications of at least four distance measurements of the feed structure relative to a rim of the main reflector;

processing circuitry configured to determine pointing errors of the main reflector relative to the feed structure based at least on the orientation information and the indications of the distance measurements by at least determining normals of at least four planes defined by sets of three distance measurements and averaging the normals to calculate a best fit for a plane defining the rim and corresponding to a relative orientation between the feed structure and the main reflector;

the processing circuitry configured to apply the pointing errors to instruct the antenna feed system to adjust steering of a signal towards a target.

* * * * *